United States Patent [19]

Burl

[11] Patent Number: 5,940,145
[45] Date of Patent: Aug. 17, 1999

[54] METHOD AND APPARATUS FOR MOTION COMPENSATED IMAGE PROCESSING USING TWO SEPARATE MOTION MEASUREMENT TECHNIQUES

[75] Inventor: Michael Burl, Twickenham, United Kingdom

[73] Assignee: British Broadcasting Corporation, London, United Kingdom

[21] Appl. No.: 08/897,380

[22] Filed: Jul. 21, 1997

Related U.S. Application Data

[63] Continuation of application No. 08/290,969, filed as application No. PCT/GB93/00403, Feb. 26, 1993, abandoned.

[30] Foreign Application Priority Data

Feb. 26, 1992 [GB] United Kingdom ............... 92-04117

[51] Int. Cl.⁶ .................................................. H04N 7/18
[52] U.S. Cl. ................... 348/699; 348/416; 348/415; 348/413; 348/170; 348/171
[58] Field of Search ............................ 348/416, 415, 348/413, 699, 700, 150, 154, 155, 169, 170, 171

[56] References Cited

U.S. PATENT DOCUMENTS

| 4,974,084 | 11/1990 | Fernando | 348/416 |
|---|---|---|---|
| 4,980,764 | 12/1990 | Henot | 358/133 |
| 5,027,205 | 6/1991 | Avis et al. | 358/140 |
| 5,043,807 | 8/1991 | Rabii | 348/499 |
| 5,063,524 | 11/1991 | Ferre et al. | 364/516 |
| 5,072,293 | 12/1991 | De Haan et al. | 348/416 |
| 5,081,531 | 1/1992 | Parker | 348/699 |
| 5,175,618 | 12/1992 | Ueda et al. | 358/136 |
| 5,226,093 | 7/1993 | Iwase | 382/41 |
| 5,227,878 | 7/1993 | Puri et al. | 358/136 |
| 5,260,782 | 11/1993 | Hui | 348/411 |
| 5,267,034 | 11/1993 | Miyatake et al. | 348/411 |
| 5,278,663 | 1/1994 | Hong | 348/416 |
| 5,289,274 | 2/1994 | Kundo | 348/699 |
| 5,430,479 | 7/1995 | Takahama et al. | 348/208 |
| 5,502,482 | 3/1996 | Graham | 348/699 |
| 5,510,834 | 4/1996 | Weiss et al. | 348/699 |
| 5,682,205 | 10/1997 | Sezan et al. | 348/452 |

FOREIGN PATENT DOCUMENTS

| 0 322 956 | 7/1989 | European Pat. Off. . |
|---|---|---|
| 0 322 956 A1 | 7/1989 | European Pat. Off. . |
| 2 188 510 | 9/1987 | United Kingdom . |
| 2 231 747 | 11/1990 | United Kingdom . |
| WO 91/14340 | 9/1991 | WIPO . |

OTHER PUBLICATIONS

Fadzil et al., Video Subband VQ Coding at 64 kbit/s Using Short–Kernel Filter Banks with an Improved Motion Estimation Technique, Image Communication, vol. 3:3–21, 1991.

*Primary Examiner*—Anand S. Rao
*Attorney, Agent, or Firm*—Dike, Bronstein, Roberts & Cushman; George W. Neuner

[57] ABSTRACT

Motion compensated image processing is performed by producing vectors assigned to elementary areas of video fields. These are produced from at least two video fields in a sequence. A first technique is used to produce the vectors. If an error signal is produced by the first technique then a second technique is used for the production of vectors.

18 Claims, 1 Drawing Sheet

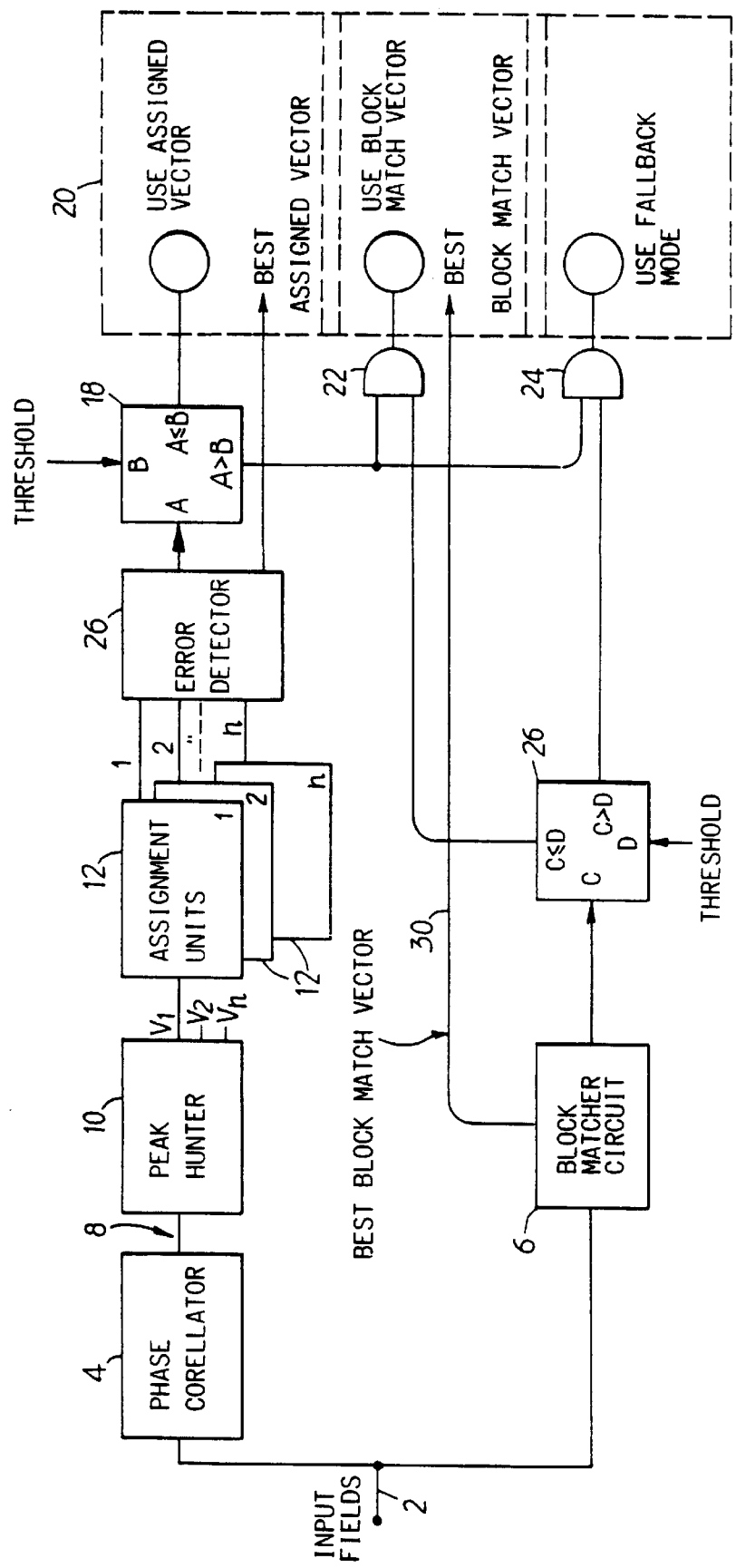

METHOD AND APPARATUS FOR MOTION COMPENSATED IMAGE PROCESSING USING TWO SEPARATE MOTION MEASUREMENT TECHNIQUES

This application is a continuation of copending application(s) Ser. No. 08/290,969 filed on Sep. 29, 1994, now abandoned, which is a 37 of International Application PCT/GB93/00403 filed on Feb. 26, 1993 and which designated the U.S.

FIELD OF THE INVENTION

This invention relates to video image processing and in particular to motion compensated image processing.

BACKGROUND OF THE INVENTION

Various motion compensation techniques may be used when it is desired to calculate a frame intermediate of two frames in a video sequence. This may be necessary in slow motion simulation or in standards conversion. The positions of moving objects within these fields are calculated with reference to a plurality of the other fields in the sequence. An example of such a motion compensation system is given in our British Patent Application No. 9111348.0.

There are two commonly used motion estimation techniques used to produce motion vectors representing the differences between a pair of video images and further techniques exist.

The first of these is phase correlation and a technique for implementing this is described in our British Patent Number 2188510B and corresponding U.S. Pat. Nos. 4,873,573, 4,890,160, and 4,942,466. This produces a list of motion vectors which are applicable over the whole area of the image and over each elementary area of the image. To use the vectors it is necessary to select which of them will apply to a given elementary area of the picture. Each elementary area may be as small as a pixel or may comprise a block of many pixels.

Phase correlation has been found to work very well for linear movements in objects and is very rarely confused by detail in the scene. It has not been found, however, to be particularly effective when used on rotating objects or on scenes where small picture elements move in different directions.

The other commonly used technique for motion estimation is known as 'block matching'. In this a block of video data n pixels by m pixels is compared with a corresponding block in a previous field and with each of a plurality of equally sized blocks within a predetermined range in that previous field. For a pair of interleaved video fields this range might be ±8 field lines vertically and ±16 pixels horizontally. The block which gives the best match to the original block is then used to derive a motion vector for that block.

When block matching systems are used they can easily break down in the matching stage and consequently can introduce inaccuracies when, for example, there is a camera pan.

In motion compensation systems the choice has usually been between phase correlation techniques and block matching techniques. The chosen technique has then been developed as far as possible to attempt to eliminate any failings caused by particular types of motion.

SUMMARY OF THE INVENTION

According to the present invention there is provided a method for motion compensated image processing comprising the steps of producing vectors assigned to elementary areas of input video fields from at least two fields in a sequence of video images by means of a first technique and producing vectors assigned to elementary areas of input video fields by means of a second technique in response to an error signal produced by the first technique.

BRIEF DESCRIPTION OF THE DRAWING

A preferred embodiment of the invention will now be described in detail by way of example with reference to the sole FIGURE shows a block diagram of the preferred embodiment of the invention.

DESCRIPTION OF THE PREFERRED EMBODIMENT

In British Patent Application No. 9111348.0 there is described a motion compensated image processing system which uses a phase correlation technique to derive motion vectors. The motion estimation comprises phase correlating the input images and from this deriving a phase correlation surface. The peaks in this correspond to motion peaks and a list of a predetermined number of these above a certain threshold is selected as a trial menu for assigning vectors to elementary areas of the picture for deriving an output field. A vector is assigned to an elementary area when its match error (calculated by applying the vector to an elementary area of an input field and summing the differences at a second input field) is below a certain level.

This embodiment of the present invention comes into operation when the match error for an elementary area exceeds this predetermined level. In such a situation a block matcher is used on that picture area and a best fit vector derived. If the match error for this vector is lower than that for the phase correlation derived vector and preferably also below the match error then it is assigned to that picture area.

The combined system uses the strengths of each method. A correctly assigned vector from the phase correlation has a very high confidence of being true motion and hence a dual system would have a priority for building pictures by this method. Where no good assignment can be made from the phase correlation technique the system will look at the match error of a block match derived vector.

The dual system will exploit the natural strengths of each technique and be less complex and more certain than current methods. A simulation using the parameters of a currently available block match integrated circuit confirms that the technique works for those regions of the picture that phase correlation finds difficult. The work to date has been carried out using a block size of 16 pixels and 8 field lines. The range of detected motions are approx ±16 pixels and ±8 field lines. Over this range of linear displacements either technique will work.

In the sole FIGURE an embodiment of the invention is shown in which input video fields 2 are provided to a phase correlator 4 and a block matcher circuit 6.

The phase correlator 4 is of the type described in British Patent No. 2188510B and produces a correlation surface 8 at its output. This forms the input to a peak hunter circuit 10 which searches the correlation surface for the highest values thereon. These correspond to the peak motion vectors between a pair of input fields and these trial vectors are provided on outputs $V_l$–$V_n$ which form inputs to assignment units 12. Typically the five highest peaks will be used as the set of trial vectors provided at the outputs.

Each assignment circuit 12 receives a single vector and tests each elementary area of an input field with that vector and produces an error signal in dependence on the error that vector generates in deriving one field from that input field. These errors 14 are provided in parallel to an error detector 16 for each elementary area in turn.

The minimum error signal detected by the error detector 16 is provided at an output coupled to an input A of a thresholding circuit 18. A second input B receives a threshold level. If the error A<B then a control signal for a vector selection 20 is generated which will then select the best assigned vector as determined by the error detection 20 for assignment to that particular elementary area of an input video field.

If the error A>B then a second output signal is generated by the thresholding circuit 18. This is an input to two AND gates 22 and 24 which receive their other inputs from a second thresholding circuit 26, the operation of which will be described below.

The second thresholding circuit 26 receives an error signal from the block matcher circuit 6. This block matcher circuit operates on the same input video fields 2 as the phase correlator 4. It generates a best block match vector 30 which is provided at an input of the vector selection circuit 20.

In the thresholding circuit 26 the block match error C is compared with a threshold D. If the error C<D then an output is generated which is coupled to the second output of AND gate 22. Thus if the phase correlation generates an error A greater than threshold B and the block matcher produces an error C less than a threshold D a logical 1 will be generated at the output of AND gate 22. This output is used to control selection circuit 20 to assign the best block match vector to the particular elementary area.

If the block match error C>D then a second output of the thresholding circuit 26 provides a signal on the second input of AND gate 24. Thus if both errors A>B and C>D neither the phase correlated vector nor the block match vector will be selected. Instead AND gate 24 will control selection circuit 20 to use a fallback mode for assigning a vector to the particular elementary area. This fallback mode could be a further vector generation and assignment technique.

It will be appreciated that there are not two motion estimators feeding trial vectors to competing assignment units in the circuit described above. This is because the vectors from the block matcher are generally less reliable than that of the phase correlator. Instead the block matcher is switched into use when the match error from the phase correlation derived vectors exceeds a predetermined level. The block size of the block matcher is fairly small and good results have been shown without any assignment at all. It is also proposed that for improved resolution in the image the block matches are overlapped 2:1 in both directions and the best vector assigned to the central ¼ area of the block. It is also proposed to determine an estimate of subpixel movements by matching a 'V' shape to the lower match error in the distortion map from the block matcher.

The vectors (probably only three plus a pan vector) from the phase correlator are assigned in a well known manner. A good match gives high confidence of being true motion. If the match is above some threshold then the block matcher is left to assign. If the block matcher also shows a high match error then a fallback method is used as before. This would comprise assigning a zero vector to that elementary area. In essence the block matcher is a more sophisticated fallback mode that will allow the processor to cope with most kinds of motion.

In a preferred system the match error is normalised by dividing it by the luminance gradient for the picture element in question. It is then compared with the threshold level to decide whether or not to use the block matcher. The reason for this normalisation is that a good match error for a picture with a lot of motion in it will be substantially different to a good match error for a picture with very little motion in it. Thus the normalisation by dividing by the luminance gradient will enable the same threshold level to be used for each picture.

The luminance gradient used for normalisation is the greatest value of luminance gradient at a picture element. It is calculated from a combination of the vertical and horizontal gradients.

I claim:

1. A method of motion-compensated video image processing to generate a synthesized image field intermediate in time between two input fields, comprising the steps of
producing first vectors assigned to elementary areas of video fields from at least two temporally spaced fields in a time sequence of video images, by means of a first technique,
testing whether said first technique results in a match error below a predetermined threshold value and, if not, generating an error signal, and
switching to a second technique of producing second vectors assigned to elementary areas of video fields from said at least two temporally spaced fields in response to any error signal produced by said testing step,
whereby in the absence of said error signal, said vectors are produced without applying said second technique, and
wherein, when switching to said second technique, the second vectors are produced by said second technique,
whereby only one of said first vectors or said second vectors are used to generate said synthesized field for an elementary area.

2. A method according to claim 1 in which the first technique comprises the steps of deriving a set of motion vectors from a phase correlation between input fields and assigning to an elementary area of a field the vector that gives the best fit in deriving one field from another.

3. A method according to claim 1 in which the second technique comprises a block matching technique.

4. A method according to claim 1, including the step of switching to a third technique of producing vectors assigned to elementary areas of video fields from said at least two temporally spaced fields in response to error signals produced by the first and second techniques.

5. A method according to claim 4 in which the third technique comprises assigning a zero vector to an elementary area.

6. A method according to claim 3 in which the block matching technique performs overlapping block matches.

7. A method according to claim 2 in which a predetermined number of motion vectors are used in the assigning step.

8. A method according to claim 1 including the step of normalising the error in the derivation of an elementary area in the output.

9. A method according to claim 8 in which the normalising step comprises dividing the error for that elementary area by the luminance gradient for that elementary area.

10. Apparatus for motion-compensated video image processing, comprising
first means for producing first motion vectors representative of differences between a pair of input video fields and assigning vectors to elementary field areas, second means for producing second motion vectors representative of differences between said pair of input video fields and assigning vectors to elementary field areas, means for producing an error signal from the first vector producing and assigning means, and means, responsive to said error signal, for switching for a given pair of input video fields from the first to the second vector producing and assigning means, whereby in the absence of said error signal, said vectors are produced without applying said second technique, and wherein, when switching to said second technique, the second vectors are produced by said second technique, whereby only one of said first vectors or said second vectors are used to generate said synthesized field for an elementary area.

11. Apparatus for motion compensated image processing according to claim 10 in which the first producing and assigning means comprises phase correlation means.

12. Apparatus for motion compensated image processing according to claim 10 in which the second producing and assigning means comprises block matching means.

13. Apparatus for motion compensated image processing according to claim 10, including third vector producing and assigning means and in which the switching means switches to the third vector producing and assigning means in response to error signals from the first and second producing and assigning means.

14. Apparatus for motion compensated image processing according to claim 10, including means for normalising errors in the derivation of an elementry area in an output field.

15. A method of deriving motion vectors representative of differences between a pair of video images, comprising the steps of:

applying phase correlation to said pair of video images to produce phase correlation motion vectors;

assigning said phase correlation motion vectors to elementary image areas and determining a first error associated with said assignment;

in dependence upon the magnitude of said first error, switching to the step of applying block matching to said pair of video images to produce and assign block matching motion vectors.

16. A method according to claim 15, further comprising the steps of determining a second error associated with the assignment of block matching motion vectors and selecting between said assigned block matching motion vector and said assigned phase correlation motion vector in dependence upon a comparison of said first and second errors.

17. A method according to claim 16, further comprising the step of assigning a zero motion vector where said first and second errors both exceed a predetermined threshold.

18. A method according to claim 2, in which the second technique comprises a block matching technique.

* * * * *